Figure 1:
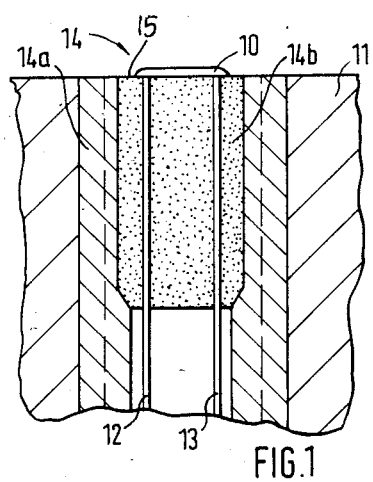

United States Patent [19]

Dobler et al.

[11] Patent Number: 4,587,840
[45] Date of Patent: May 13, 1986

[54] PRESSURE SENSOR FOR INSTALLATION IN A WALL ELEMENT SUBJECTED TO PRESSURE OF A FLUID MEDIUM, SUCH AS A HYDRAULIC PRESSURE LINE, E.G. IN DIESEL FUEL INJECTION SYSTEMS

[75] Inventors: Klaus Dobler; Werner Grünwald, both of Gerlingen, Fed. Rep. of Germany

[73] Assignee: Robert Bosch GmbH, Stuttgart, Fed. Rep. of Germany

[21] Appl. No.: 627,917

[22] Filed: Jul. 5, 1984

[30] Foreign Application Priority Data

Sep. 12, 1983 [DE] Fed. Rep. of Germany ....... 3332880

[51] Int. Cl.⁴ ............................................. G01M 15/00
[52] U.S. Cl. .................................... 73/119 A; 73/754; 338/36
[58] Field of Search .................... 73/119 A, 754, 753; 338/4, 36

[56] References Cited

U.S. PATENT DOCUMENTS 3,122,919 3/1964 Kendrick ........................ 73/754 X
3,270,562 9/1966 Ehrenreich et al. ................. 73/754
4,027,536 6/1977 Heggie ........................ 73/119 A X

FOREIGN PATENT DOCUMENTS 3125640 1/1983 Fed. Rep. of Germany .

*Primary Examiner*—Jerry W. Myracle
*Attorney, Agent, or Firm*—Frishauf, Holtz, Goodman & Woodward

[57] ABSTRACT

To provide an unyielding support surface for a film-type, typically thick-film resistor (10) made of pressure-responsive resistance material, an unyielding pressure-tight mass of insulating material, for example a melt of glass, ceramic, or suitable plastic, is introduced into a wall portion of a wall element (11) in which a fluid pressure medium, such as high-pressure fluid for injection to a Diesel engine, is retained. The insulating mass is, preferably, formed as a plug element, for example retained within a metal screw which, simultaneously, can form a venting screw for the fuel injection system. One or two electrical conductors (12, 13) pass through the plug element, which if a metal screw, surrounds the insulating mass, the resistance element can extend over the edge of the metal which, then, can form a ground or return connection. The surface of the plug element is either flush with the surface of the wall or, for example, forms a laterally relieved slot extending parallel to the axis of the plug, which slot may be filled with a protective pressure-transmitting compound and covering the electrical resistance element there located, so that the end surface of the screw and pressure-transmitting filler will be flush with the wall (11) confining the pressure medium.

21 Claims, 10 Drawing Figures

PRESSURE SENSOR FOR INSTALLATION IN A WALL ELEMENT SUBJECTED TO PRESSURE OF A FLUID MEDIUM, SUCH AS A HYDRAULIC PRESSURE LINE, E.G. IN DIESEL FUEL INJECTION SYSTEMS

The present invention relates to a pressure sensor, and more particularly to a pressure sensor which can be easily incorporated in a wall structure subjected to fluid pressure, typically hydraulic pressure, e.g. as exerted by fuel injection apparatus such as fuel injection pumps for Diesel engines, gasoline engines, or the like; the apparatus is particularly suitable, in general, for determining high hydraulic pressures which may be controlled in a control loop of which the pressure sensor forms a part.

BACKGROUND

Various types of pressure sensors to determine the pressure of a medium engaging a wall, typically a fluid, and especially a liquid medium, are known. Pressure sensing elements which determine such pressure may use an electrical resistance element which is subjected to the medium, the pressure of which is to be determined, and which changes its electrical resistance in dependence on the pressure applied thereon. Such resistance elements, as such, are known. Other types of sensors are known in which the resistance element is formed as a layer or film structure which is secured to an individual carrier. For example, German Patent Disclosure Document DE-OS No. 31 25 640 describes a sensor which changes its resistance upon being subjected to pressure, and in which a base structure is used carrying two electrical supply lines leading through the wall on which the resistance element itself is secured. The resistance element itself is a film or layertype resistor extending between two ends of the respective connecting or supply lines. The resistance element is secured to a metallic base structure which surrounds an insulating material mass through which the supply lines extend and which, in turn, projects towards the end of the base structure up to the pressure region, typically a pressure chamber. The described sensor, thus, has a layer resistor secured to a carrier which is located at the pressure side of a structural element receiving a casting compound of insulating material and which has elastic or yielding characteristics, and through which the connecting lines for the layer resistors are conducted.

It has been found that the insulating material on which the layer resistor is applied does not have the required mechanical strength to withstand high pressures, and especially high hydraulic pressures, to be able to function as a support for a layer resistor. Upon application of very high pressures, the continuity of the layer resistor may be impaired.

THE INVENTION

It is an object to improve a pressure sensor, and more particularly a pressure sensor structure adapted to sense high hydraulic pressures, and, additionally, to provide an element which can be assembled directly in a pressure fluid circuit, for example by passing through the wall of a vessel, duct, or pipe line, or manifold, within which a pressure chamber or pressure zone is defined.

Briefly, a layer or film-type pressure-responsive resistance element, typically a thick-film, but it may also be a thin-film resistance layer, is located exposed to the fluid medium and in pressure-responsive relationship to the medium. At least one electrical conductor passes through the plug element and in terminating electrical contact relation with the resistance element; two conductors can be used, or the plug element, if of metal, can form one terminal of the resistance sensing layer itself.

In accordance with a feature of the invention, an insulating mass of pressure resistant material surrounds the at least one electrical conductor, and extends up to the resistance element and forms an essentially unyielding support and carrier surface for the pressure-responsive resistance element. The insulating mass may, for example, be a melt of glass, ceramic, or other suitable electrically insulating and pressure-resistant and pressure-tight material. For protection, the pressure-responsive resistance layer may be coated with a yielding, pressure-transmitting protective layer.

If the wall element is of unyielding insulating material, the resistance layer can be directly applied thereto. If the wall element or structure is of metal, the metal may form one electrical conductor for the resistance layer. A separable plug, of ceramic or glass melt, is suitable. The plug element may be in form of a separate screw.

The element is particularly suitable to determine the pressure in the pump housing of a fuel injection pump or combination fuel injection distributor pump for Diesel engines. The resistance element, if in form of a screw plug, can serve, simultaneously, as a vent screw or bleed screw in a fuel injection pump, a fuel injection conduit, or a pump-distributor combination, in which the injection pressure of Diesel engine fuel is to be determined.

The arrangement has the advantage that the layer resistor, which forms the actual pressure-sensing resistance element, does not require a special support structure, since the support for the layer resistor is formed by part of the wall structure the chamber within which the pressure is to be measured. The part of the chamber may be a continuous wall portion of the chamber itself, a separable plug element, inserted through the chamber wall, typically a screw. The wall structure or the plug element, of course, must be constructed to carry at least one connecting conductor to the resistor. Additionally, and if formed as a screw, the plug element can have further combined functions unrelated to pressure measurement as such, so that multiplicity of bores through a wall confining high-pressure fluid can be avoided, thus reducing danger of leakage, or structural weakening of the walls confining the high pressure fluid.

DRAWINGS

FIG. 1 is a longitudinal cross-sectional view through a sensor plug structure illustrating a first embodiment; and FIGS. 2 through 10 are views similar to FIG. 1, and illustrating different embodiments of the sensor structure.

The sensor structures shown in FIGS. 1–10 are used to measure the pressure of a medium within a pressure zone or pressure chamber. The sensors use a resistance element 10, which has the characteristic to change its resistance when subjected to pressure. Such resistance elements are well known, and any suitable layer-type resistance element, such as a thick-film or a thin-film, preferably a thick-film, may be used. The pressurized medium acts on the resistance element 10. The pressurized medium is confined within a chamber defined, in part, by a wall 11. The wall 11 may be part of a closed or an open vessel in which the pressure is to be determined, for example, by hydrostatic pressure, at a specific wall location; wall 11 may, also, be part of a pressure hose, a pressure pipe, a trough, or another pressurized container. The medium, the pressure of which is to be determined by the resistance layer 10, may be stationary, or may be flowing.

The sensor is particularly suitable to measure high pressures which arise in hydraulic systems, such as control systems for various hydraulically operated devices, or for the measurement of pressures which occur in the fuel injection circuit of internal combustion engines, such as Diesel engines. When used with internal combustion engines, where the sensors are particularly applicable, they may form part of a control system in which various operating parameters have to be sensed to provide for optimum combustion of fuel within the internal combustion engine (ICE), for example quantity of fuel being injected in relation to then obtaining operating or operation characteristics, loading, and the like, on the engine. The injected fuel quantity can be obtained by determining the pressure of the fuel being injected, and the injection time, with the injection nozzle characteristics and parameters, of course, being known.

Embodiment of FIG. 1: Resistance element 10 is secured within the wall 11 confining pressurized fluid. A plug structure 14 is provided which, simultaneously, forms a support for the resistance element 10 and permits connection of two connecting conductors 12, 13, leading to the resistance element 10. The connection conductors may be physical wire lines. As shown by the schematic representation, the plug element 14 is formed as a screw which can be inserted within a tapped opening in the wall 11, by being passed therethrough in pressure-tight relation. Rather than using a screw—and if suitable and desirable—a pressfit tightly inserted element may be used.

The plug element 14, typically a screw, has a metallic base body 14a and an internally located glass melt 14b, surrounded by the metallic base body. The glass melt retains the two connecting lines 12, 13 and extends up to the side of the base body 14a which is adjacent the inner surface of the wall 11.

Rather than using a glass melt 14b, any other high-pressure-resistant material may be used, such as a melt of ceramic or other electrically insulated, pressure-resistant material. The glass or ceramic melt 14b forms, simultaneously, the carrier for the resistance element 10, and the insulator for the connecting lines 12, 13. The resistance element 10 is constructed as a thick-film resistor, which extends between the connecting lines 12, 13, and slightly therebeyond—see FIG. 1. The connecting lines 12, 13 and the glass melt 14b terminate flush with the surface of the plug, so that the connecting lines 12, 13 can be easily bridged by the thick-film resistor 10, without requiring any special manufacturing steps or mechanical features which are not customary and standard in film technology, either thick-film or thin-film technology. Thus, a sensor of this type which has a plug element with a glass or ceramic melt therein can be manufactured particularly easily and cheaply. The connecting wires 12, 13 are carried to suitable terminations, not shown, and which may be of any standard and well-known construction.

Figure 2:
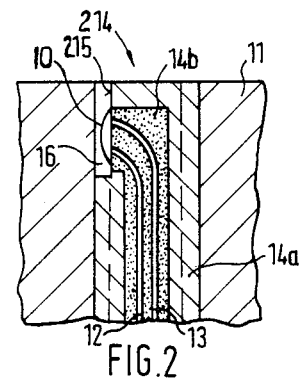

Embodiment of FIG. 2: The layer or film resistor 10 is located on a lateral surface 215 of the plug element 214, again formed as a screw. The plug element 214 has a lateral recess or relief milled parallel to the axis of the plug, for example screw 214. The layer resistor 10 is then so arranged that it is not directly exposed to the pressure chamber, but rather faces the wall portion within the wall 11 which is tapped to receive screw 214. The lateral surface 215 formed by the plug element is recessed with respect to the tapped bore to such an extent that a slot-like chamber 16 will be formed which is suitable not only to receive the pressure-responsive resistance layer 10, but also provide some space for penetration of the fluid medium, the pressure of which is to be measured, into the space 16.

This arrangement has the advantage that the layer resistor 10 is particularly well protected with respect to damage or contamination. The volume of the pressure chamber is not reduced; it may even be slightly increased. This is particularly of advantage when the sensor is to be installed in a distributor fuel injection pump in a motor vehicle, for example to distribute and provide injection pressure for a multi-cylinder Diesel engine.

It is also possible to retain the exact and precise volume of the pressure chamber; if it is undesirable to have the additional volume of the space 16 filled with pressurized medium, a continuously elastic and pressure-resistant mass may be introduced into the chamber 16, and terminated flush with the end surface of the plug unit 214. Such a pressure-resistant, elastic mass is not shown in FIG. 2 since its use is optional, in order to to prevent confusion in the drawing. The arrangement is particularly suitable if the plug unit 214 is formed as a vent or bleed screw for the pressure chamber. The elastic pressure-transmitting but pressure-resistant mass can then form part of the plug element 214, to be inserted and removed therewith, upon threading the plug unit 214 into the matching thread in the wall 11. Pressure-resistant, fluid-tight connection can be effected by well-known expedients in connection with removable insertion of elements to or in a pressure chamber, for example by sealing tapes or the like.

Figure 3:
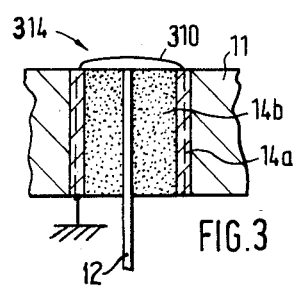

Embodiment of FIG. 3: The elements of FIGS. 1 and 3 are essentially identical, except that only a single connecting line 12 is used, passing through the glass or ceramic melt 14b, and the resistor element 310 extends over the metal edge of the plug unit 314. One electrical terminal, thus, is formed by the metallic base structure 14a of the plug unit, typically a screw 314. Preferably, the connecting line 12 in this embodiment is placed centrally along the axis of the plug unit, typically a screw.

Figure 4:
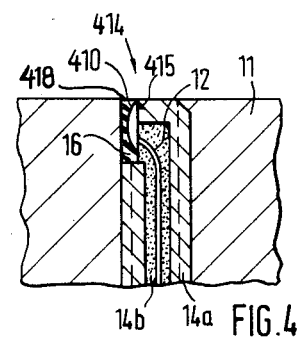

Embodiment of FIG. 4: This embodiment is similar to that of FIG. 2, except that the concept of a single connecting line, as explained in connection with FIG. 3, is incorporated in the lateral structure described in detail in connection with FIG. 2. Only a single connection 12 is used, again positioned centrally within a screw 414. The geometric arrangement corresponds to that of FIG. 2. A casting compound which is highly pressure-resistant, yet pressure-transmissive, shown at 418, encapsulates the pressure resistor 410 which extends over part of the metallic end surface 415 of the screw 414.

Figure 5:
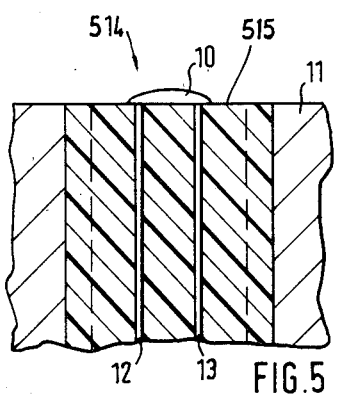
Figure 6:
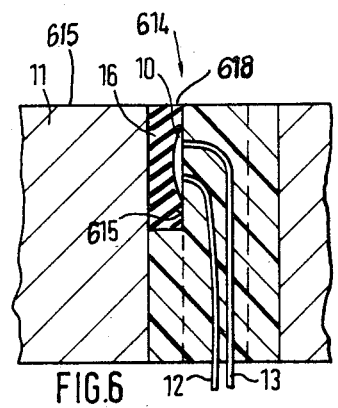

Embodiment of FIGS. 5 and 6: The general construction and geometric arrangements correspond to those of FIGS. 1 and 2; two connecting lines 12, 13 are provided connected to the resistance element 10. The plug element 514, 614, respectively, is formed as a screw, and receives and retains the connecting lines 213. Differing from the plug elements of FIGS. 1, 2, the plug element is made of unitary insulating material, thus not requiring a separate glass melt. The space 16 can, again, be filled with a pressure-transmissive, elastic, but pressure-resistant casting compound 618. Surfaces 515, 615 are flush with wall 11.

Figure 7:
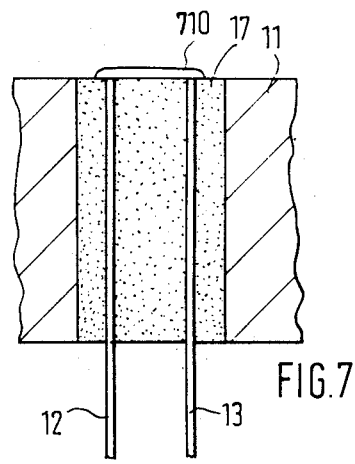
Figure 8:
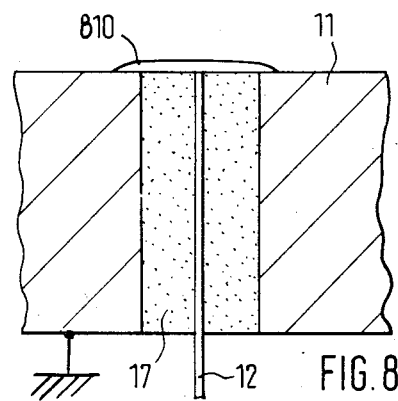

Embodiment of FIGS. 7 and 8: Rather than making the resistor unit as a separable plug element, a melt 17 can be melted into a suitable opening 11 of the wall structure itself, the melt, for example of glass or ceramic, retaining the connecting lines 12, 13 (FIG. 7) or a single connecting line 12 (FIG. 8). In either case, the resistance layer 710, 810 is applied directly to the surface of the melt facing the hydraulic pressure medium. This surface is, preferably, flush with the surface of the retaining wall 11. The plug or melt element 17 is irremovably fitted into the wall 11, for example by being melted therein with the wires 12, 13 therearound, during a melting-in manufacturing step. In the embodiment of FIG. 7, the layer resistor 710 extends over the flush end terminals of the connecting lines 12, 13; in the embodiment of FIG. 8, the layer resistor 810 extends over the adjacent wall portions of the wall 11, which, then, will form a second terminal connection, for example a ground or chassis connection, from the sensor. The extent of the resistance element 810 over the wall 11 is not critical; a small marginal zone is sufficient, just enough to provide reliable electrical termination of the resistance element 10 to the wall 11.

Figure 9:
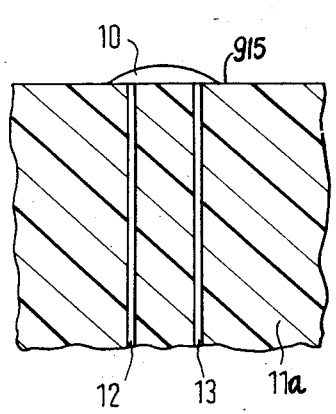

Embodiment of FIG. 9: If the wall is made of insulating material, for example a high-pressure-resistant plastic, or an internal plastic liner or pipe within a pressure-retaining outer wall structure, which may, for example, be in form of a metal mesh, two connecting lines 12, 13 can be directly passed through the wall structure 11a, under pressure-tight conditions, terminating flush with the surface of the wall structure 11a facing the pressure medium, the flush ends of the connectors 12, 13 being bridged by the resistor 10.

Figure 10:
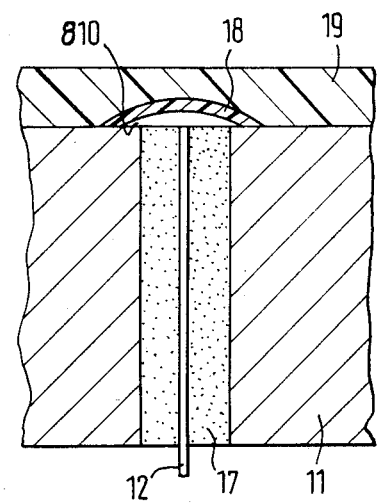

Embodiment of FIG. 10: In one or all of the embodiments, of which the embodiment of FIG. 8 has been selected as representative, it is possible to cover the resistance layer 810, preferably a thick-film resistance layer, with a protective covering layer 18. The protective layer 18 is pressure-transmissive, for example made of a suitable casting compound. A pressure elastic casting mass 19 is provided, covering the protective layer 18.

Various changes may be made, and any features described herein, for example in connection with any one of the drawings or embodiments, may be used with any of the others, within the scope of the inventive concept; specifically, the showing of the protective layer 18 and the casting compound 19 is not limited to the construction shown in FIGS. 8 and 10, but, rather, may be equally applied to anyone of the structures of the other embodiments.

A suitable resistance element 10 is described, for example, in: Conference Proceeding "Third European Hybrid Microelectronics Conference 1981" (Avignon, France) p. 207-218.

Suitable materials other than glass or ceramic for the melt 14b, or the insulating material of FIGS. 5 and 6 are: plastics, preferably PTFE.

Suitable protective material and/or pressure-transmitting covering materials 418, 618, 18 are: plastics, cast resin, varnish non metalic foil (FIG. 10).

A suitable protective compound 19 (FIG. 10) is: AREMCO CAST Nr. 554 with Activator and 40 w% AREMCO SEAL 529 available at TEK Hannover, Vahrenwalder Str. 121 3000 Hannover (W-Germany).

We claim:

1. Pressure sensor to determine fluid pressure against a wall (11) having
   a layer or film-type pressure-responsive resistance element (10) and a support for said layer or film-type resistance element,
   wherein, in accordance with the invention,
   the support for said layer or film-type resistance element comprises, at least in part, a pressure-resistant, essentially unyielding electrically insulating material (14, 214, 314, 414, 514, 614, 17, 11a, 11);
   and at least one electrical conductor (12, 13) passing through and sealed into the pressure-resistant, essentially unyielding electrically insulating support, terminating beneath the surface of the layer or film-type pressure-responsive resistance element exposed to said fluid pressure, and electrically connected to said layer or film-type pressure-responsive resistance element (10),
   said pressure-resistant electrically insulating support forming, simultaneously, an essentially unyielding carrier substrate for the layer or film-type pressure-responsive resistance element and an insulator for the at least one electrical conductor extending therethrough.

2. Sensor according to claim 1, wherein the pressure-resistant, essentially unyielding electrically insulating material comprises glass, ceramic, and electrically insulating, pressure-tight, essentially rigid material other than glass or ceramic.

3. Sensor according to claim 1, further comprising an essentially cylindrical plug (14a) surrounding said pressure-resistant, essentially unyielding electrically insulating material.

4. Sensor according to claim 3, wherein said insulating material comprises a melt of: glass; ceramic; another electrically conductive pressure-tight, essentially unyielding material capable of being melted within the cylindrical plug (14a),
   the at least one electrical conductor passing through said melt.

5. Sensor according to claim 3, wherein only one electrical conductor (12) is provided, passing through the insulating material;
   the plug is a metal plug;
   and the pressure-responsive resistance element (10) extends over the edge of the surface of the insulating material and over part of an end surface of the cylindrical metal plug, the cylindrical metal plug forming a second conductive path for the resistance element.

6. Sensor according to claim 1, wherein the at least one electrical conductor (12, 13) terminates flush with the insulating surface and in electrical surface contact with said pressure-responsive resistance element (10).

7. Sensor according to claim 1, further including an essentially cylindrical metal plug (14a) surrounding said pressure-resistant, essentially unyielding electrically insulating material;
   and wherein the surface of said pressure-resistant, essentially unyielding electrically insulating material is essentially parallel to a surface of the wall (11) facing the pressure medium.

8. Sensor according to claim 1, wherein the wall (11) is formed with a cylindrical bore;

an essentially cylindrical plug (14a) is provided, surrounding said pressure-resistant, essentially unyielding electrically insulating material, and fitted into said bore in pressure-tight relation;

a lateral, flat surface (215, 415, 615) extending generally axially, formed on said plug, and located within said cylindrical bore;

and wherein the resistance element (10) is located against said lateral flat surface and within a space between said surface and said bore.

9. Sensor according to claim 8, wherein said plug comprises a metal element having an inner opening, terminating at said lateral flat surface;

and the insulating material comprises a melt of glass, ceramic, or other essentially unyielding, pressure-resistant electrically insulating material, located within said opening in the plug and terminating flush with said lateral surface.

10. Sensor according to claim 8, wherein said plug comprises electrically insulating material.

11. Sensor according to claim 8, further including pressure-transmitting yielding electrically insulating material (418, 618) in the space between the inner wall of the cylindrical bore in said wall (11), said lateral flat surface on the plug, and covering the resistance element, to protect the resistance element from direct contact with the pressure fluid while transmitting pressure exerted by the fluid against the wall and hence against the yielding insulating material (418, 618) therein.

12. Sensor according to claim 1, wherein the wall (11) is formed with a tapped bore;

and an essentially cylindrical plug (14a) is provided, surrounding and retaining said pressure-resistant, essentially unyielding electrically insulating material, said plug (14, 214, 314, 414, 514, 614) comprising a screw insertable in said tapped bore and retainable therein in pressure-tight position.

13. Sensor according to claim 12, wherein said wall (11) comprises a portion of a fuel injection system for an internal combustion engine;

and wherein the screw defined by said plug forms a venting screw for said fuel injection system.

14. Sensor according to claim 1, wherein said resistance element (10) comprises a thick-film resistor.

15. Sensor according to claim 14, wherein said wall (11) is formed with an essentially cylindrical bore;

and said pressure-resistant, essentially unyielding electrically insulating material comprises a plug passing through said bore formed of a melt of glass, ceramic, or plastic, melted-in within said bore, said at least one electrical conductor (12, 13) passing through and being melted into said melt, said melt having a surface facing the pressure medium, and parallel to the adjacent surface of the wall (11).

16. Sensor according to claim 15, wherein the wall (11) comprises metal;

and wherein the at least one electrical conductor comprises a single connecting wire (12) located essentially centrally within said plug, the electrical resistance element forming a film resistor extending over the surface of the plug and onto adjacent surface portions of the wall (11), the metal wall forming a second electrically conductive connection to the resistance element.

17. Sensor according to claim 1, further including a protective cover layer of pressure-transmitting insulating material (18) covering the layer or film-type pressure-responsive resistance element (10).

18. Sensor according to claim 17, further including a pressure-transmitting elastic potting or covering compound (19) surrounding said protective layer (18).

19. Sensor according to claim 1, wherein said wall (11) comprises insulating material against which said fluid pressure is exerted;

said layer or film-type pressure-responsive resistance element (10) being applied to a surface portion of the wall in a zone thereof exposed to the medium and in pressure-responsive relation to said fluid medium;

and wherein said at least one electrical conductor comprises two conductors passing through the wall of insulating material, terminating in electrical contact with said resistance element (10), the electrical resistance element extending at least between the two electrical conductors.

20. Sensor according to claim 19, wherein the layer or film-type pressure-responsive resistance element (10) forms a resistor of essentially disk shape.

21. In combination with a wall forming a confining wall for a fluid pressure medium, a pressure sensor to determine fluid pressure against the wall having a layer or film-type pressure-responsive resistance element (10), and a support for the layer or film-type resistance element, wherein, in accordance with the invention, a hollow metal screw is provided, formed with an essentially centrally located opening therein, said hollow metal screw being screw-fitted through a tapped bore within said wall (11);

said support for said resistance element (10) comprising a melt of glass, ceramic, or pressure-resistant, pressure-tight, essentially unyielding plastic and forming, at least in part, an essentially unyielding support and carrier surface for the film-type resistance element (10), filled in the hollow of the screw;

at least one electrical conductor (12, 13) passing through and melt-sealed into said melt, said at least one electrical conductor being electrically connected to said layer or film-type pressure-responsive resistance element (10);

and wherein the surface of said melt terminates essentially flush with an end surface of the screw, which end surface is subjected to fluid pressure by said medium.

* * * * *